United States Patent
Rosen et al.

(10) Patent No.: US 8,385,162 B2
(45) Date of Patent: Feb. 26, 2013

(54) SHINGLED-WRITING THERMAL ASSISTANCE RECORDING (TAR) DISK DRIVE WITH AVOIDANCE OF ADJACENT TRACK ERASURE FROM A WIDE-AREA HEATER

(75) Inventors: Hal J. Rosen, Los Gatos, CA (US); Barry Cushing Stipe, San Jose, CA (US); Petrus Antonius VanDerHeijden, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 99 days.

(21) Appl. No.: 13/192,437

(22) Filed: Jul. 27, 2011

(65) Prior Publication Data

US 2013/0028061 A1 Jan. 31, 2013

(51) Int. Cl.
*G11B 11/00* (2006.01)

(52) U.S. Cl. .................. 369/13.33; 369/13.13; 360/59

(58) Field of Classification Search ............... 369/13.33, 369/13.13, 53.15, 30.17, 13.32, 13.03, 13.02, 369/112.27; 360/75, 59, 31, 77.02, 39, 78.04, 360/78.06, 48, 60
See application file for complete search history.

(56) References Cited

U.S. PATENT DOCUMENTS

| | | | |
|---|---|---|---|
| 6,185,063 B1 | 2/2001 | Cameron | |
| 7,490,212 B2 | 2/2009 | Kasiraj et al. | |
| 7,567,400 B2 | 7/2009 | Cheng | |
| 7,974,029 B2 * | 7/2011 | Tsai et al. | 360/31 |
| 8,068,299 B2 * | 11/2011 | Tsunokawa et al. | 360/39 |
| 8,264,918 B2 * | 9/2012 | Hashimoto et al. | 369/13.33 |
| 2008/0239901 A1 | 10/2008 | Tsunokawa et al. | |
| 2010/0033865 A1 | 2/2010 | Hashimoto et al. | |
| 2011/0026159 A1 | 2/2011 | Tsai et al. | |

FOREIGN PATENT DOCUMENTS

JP  2010152972  8/2010

OTHER PUBLICATIONS

Knight et al., "Adjacent Track Aging in Heat Assisted Magnetic Recording", Journal of the Magnetics Society of Japan, vol. 32 (2008), No. 2_2 pp. 162-167.

* cited by examiner

*Primary Examiner* — Ali Neyzari
(74) *Attorney, Agent, or Firm* — Thomas R. Berthold (57) ABSTRACT

A thermally-assisted recording (TAR) disk drive that uses "shingled" recording and a rectangular waveguide as a "wide-area" heat source includes a controller that counts the number of writes to each annular band of data tracks. The wide-area heater generates a heat spot that extends across multiple tracks, so that each time an annular band is written, the data in tracks in adjacent bands are also heated. Because the bands are written independently, the number of passes of the heat spot and thereby the number of times the data tracks in a band are exposed to elevated temperatures without being re-written is related to the number of re-writes of the adjacent bands. The number of writes to each band is counted and when that count reaches a predetermined threshold value, one or more tracks in an adjacent band are re-written to avoid reaching an unacceptable level of magnetization decay in the tracks of the adjacent band.

12 Claims, 4 Drawing Sheets

SHINGLED-WRITING THERMAL ASSISTANCE RECORDING (TAR) DISK DRIVE WITH AVOIDANCE OF ADJACENT TRACK ERASURE FROM A WIDE-AREA HEATER

RELATED APPLICATION

This application is related to application Ser. No. 13/102,959 filed May 6, 2011 and assigned to the same assignee as this application.

TECHNICAL FIELD

This invention relates generally to a "shingled" writing magnetic recording disk drive that also uses thermally-assisted recording (TAR), and more particularly to such a disk drive that uses a wide-area heater to heat an area of the disk wider than the data track to be written.

BACKGROUND OF THE INVENTION

Magnetic recording disk drives that use "shingled writing", also called "shingled recording", have been proposed. In shingled writing, the write head, which is wider than the read head in the cross-track direction, writes magnetic transitions by making a plurality of consecutive circular paths that partially overlap. The non-overlapped portions of adjacent paths form the data tracks, which are thus narrower than the width of the write head. The data is read back by the narrower read head. The narrower data tracks thus allow for increased data density. The data tracks are arranged on the disk as annular bands separated by annular inter-band gaps. When data is to be re-written, all of the data tracks in an annular band are also re-written. Shingled writing is well-known in the art, for example as described in U.S. Pat. No. 6,185,063 B1.

In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_u V$, where V is the volume of the magnetic grain. Thus a recording layer with a high $K_u$ is important for thermal stability. However, increasing $K_u$ also increases the short-time switching field $H_0$ of the media, which is the field required to reverse the magnetization direction. For most magnetic materials $H_0$ is substantially greater, for example about 1.5 to 2 times greater, than the coercive field or coercivity $H_c$ measured on much longer time-scales. Obviously, the switching field cannot exceed the write field capability of the recording head, which currently is limited to about 12 kOe for perpendicular recording.

Since it is known that the coercivity of the magnetic material of the recording layer is temperature dependent, one proposed solution to the thermal stability problem is thermally-assisted recording (TAR), also called heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed TAR systems, the magnetic recording material is heated to near or above its Curie temperature. The recorded data is then read back at ambient temperature by a conventional magnetoresistive (MR) read head.

Some proposed TAR disk drives use a "wide-area" heater that heats an area of the disk much wider than the data tracks. A wide-area heater, typically a waveguide coupled to a laser and with an output end near the media, is relatively easier to fabricate and implement in a conventional recording head structure. The previously-cited related application discloses a shingled-recording TAR disk drive with a wide-area heater.

In a TAR disk drive with a wide-area heater, the wide-area heater will heat data tracks in bands adjacent to the band being re-written. Wide-area heaters have been shown to result in substantial adjacent track erasure (ATE) because the peak temperature extends into adjacent tracks. Because the data tracks adjacent to the data track being written are also heated, the stray magnetic field from the write head may erase data previously recorded in the adjacent tracks. Moreover, even in the absence of a magnetic field, the heating of adjacent data tracks will accelerate the thermal decay rate of the media in adjacent tracks over that at ambient temperature, leading to possible ATE due to thermal effects alone. ATE generally translates into an increase in bit error rate (BER), resulting in degradation of the performance of the disk drive. In some severe cases, poor BER will lead to a significant increase of unrecoverable data errors. ATE has been described by Zhihao Li et al., "Adjacent Track Erasure Analysis and Modeling at High Track Density", *IEEE TRANSACTIONS ON MAGNETICS, VOL. 39, NO. 5, SEPTEMBER* 2003, pp. 2627-2629.

Thus in a shingled-recording TAR disk drive with a wide-area heater it is necessary to avoid ATE of tracks in the bands adjacent to the band where data is being written.

SUMMARY OF THE INVENTION

The invention relates to a thermally-assisted recording (TAR) disk drive that uses "shingled" recording and a rectangular waveguide as a "wide-area" heat source. With a wide-area heater that generates a heat spot that extends across multiple tracks, each time an entire annular band is written, the data in tracks in the bands adjacent to the band being written will also be heated. Because the bands are written independently, the number of passes of the heat spot and thereby the number of times the data tracks in a band are exposed to elevated temperatures without being re-written is related to the number of re-writes of the adjacent bands. This can result in an unacceptable level of magnetization decay. In this invention the number of writes to each band is counted and when that count reaches a predetermined threshold value, one or more tracks in an adjacent band are re-written. The amount of acceptable magnetization decay is chosen, for example 5%, 10%, etc., and the decay time corresponding to this magnetization decay is calculated and used to determine when written data needs to be re-written. This calculated decay time is used to determine the number of times (a predetermined count threshold) that a band can be written or re-written before adjacent bands, or selected tracks within adjacent bands, need to be re-written because the loss of magnetization is too large.

For a fuller understanding of the nature and advantages of the present invention, reference should be made to the following detailed description taken together with the accompanying figures.

DETAILED DESCRIPTION OF THE INVENTION

Figure 1:
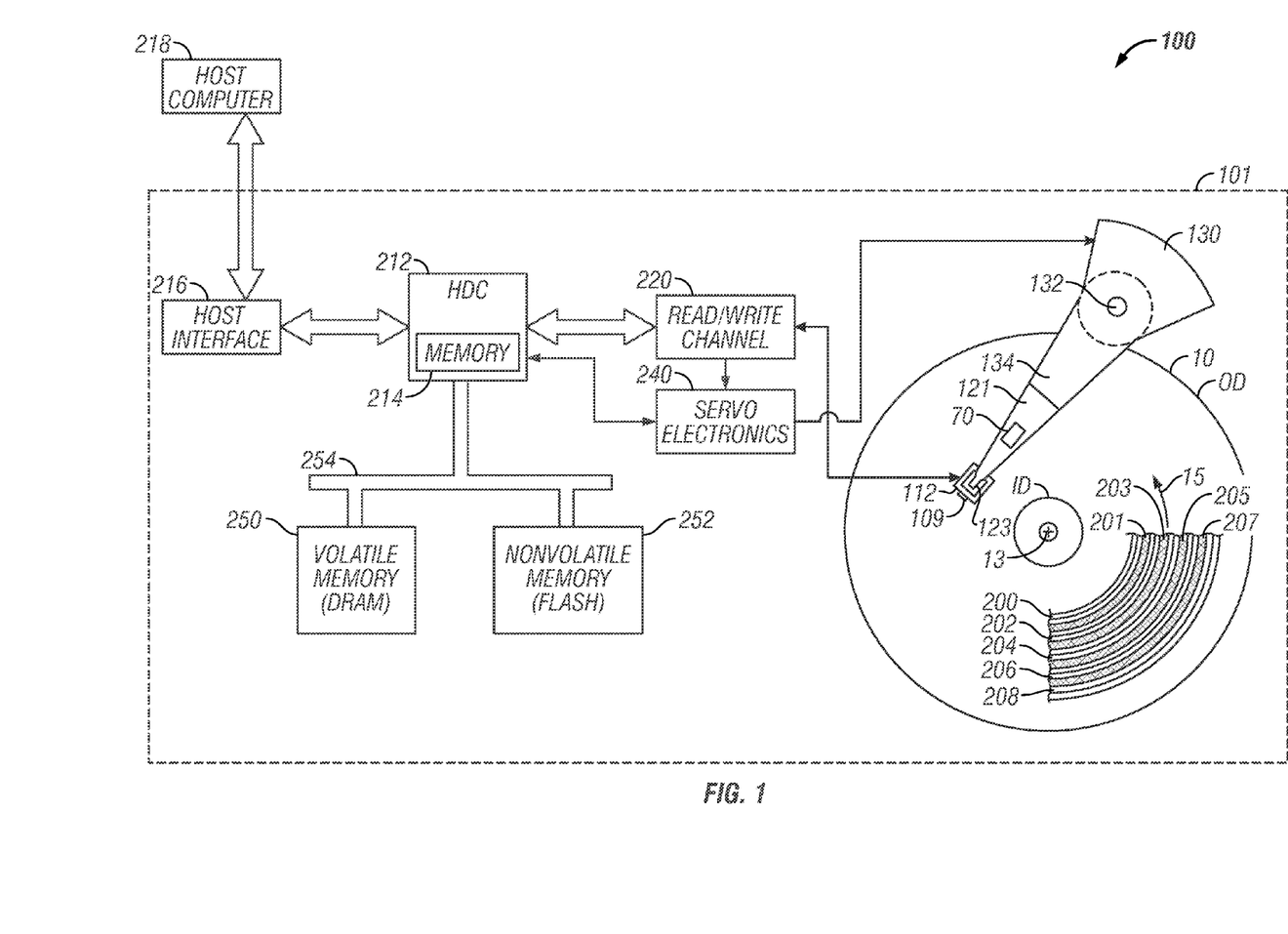
FIG. 1 is a top view of a thermally-assisted recording (TAR) disk drive with shingled recording according to the invention described in the previously-cited related application.

FIG. 1 is a top view of a thermally-assisted recording (TAR) disk drive 100 with shingled recording according to the invention. The disk drive has a housing or base 101 that supports an actuator 130 and a spindle motor (not shown) for rotating the magnetic recording disk 10 about its center 13 in the direction indicated by arrow 15. The actuator 130 may be a voice coil motor (VCM) rotary actuator that has a rigid arm 134 and rotates about pivot 132. A head-suspension assembly includes a suspension 121 that has one end attached to the end of actuator arm 134, a flexure 123 attached to the other end of suspension 121, and a head carrier, such as an air-bearing slider 122, attached to the flexure 123. The suspension 121 permits the slider 122 to be maintained very close to the surface of disk 10 and the flexure 123 enables the slider 122 to "pitch" and "roll" on an air-bearing generated by the rotating disk 10. The slider 122 supports the read/write or recording head 109 located on the end face 112 of slider 122. The recording head 109 is typically a combination of an inductive write head with a magnetoresistive read head (also called a read/write head). A laser 70 is supported on suspension 121, but alternatively could be supported on arm 134 or slider 122. The slider 122 supports an optical channel or waveguide (not shown in FIG. 1) for directing radiation from laser 70 to the disk 10. Only one disk surface with associated slider and recording head is shown in FIG. 1, but there are typically multiple disks stacked on a hub that is rotated by a spindle motor, with a separate slider and recording head associated with each surface of each disk.

In this invention the disk drive uses shingled recording, also called shingled writing. Thus FIG. 1 also illustrates portions of the circular shingled recording data tracks grouped as annular regions or bands on the recording layer of disk 10. Only portions of five bands 200, 202, 204, 206 and 208 are depicted, but there would typically be a large number of bands. Adjacent bands are separated by inter-region or inter-band annular gaps, such as typical gaps 201, 203 and 206. For example, for a 2.5 inch disk drive with shingled recording, the data tracks may have a cross-track width (TW) of about 50 nm with each band containing several hundred tracks and with each gap separation between the bands being about 100 nm (or about 2 TW). In shingled recording the write head, which is wider than the read head in the cross-track direction, writes magnetic transitions by making a plurality of consecutive circular paths that partially overlap. The non-overlapped portions of adjacent paths form the data tracks, which are thus narrower than the width of the write head. The data is read back by the narrower read head. When data is to be re-written, all of the data tracks in an annular band are also re-written.

As is well known in the art, the data in each data track in each of the bands is also divided into a number of contiguous physical data sectors (not shown). Each data sector is preceded by a synchronization (sync) field, which is detectable by the read head for enabling synchronization of reading and writing the data bits in the data sectors. Also, each data track in each of the bands includes a plurality of circumferentially or angularly-spaced servo sectors (not shown) that contain positioning information detectable by the read head for moving the read/write head 109 to desired data tracks and maintaining the read/write head 109 on the data tracks. The servo sectors in each track are typically aligned circumferentially with the servo sectors in the other tracks so that they extend across the tracks in a generally radial direction.

The disk drive 100 also includes a hard disk controller (HDC) 212 that can include and/or be implemented by a microcontroller or microprocessor. The controller 212 runs a computer program that is stored in memory 214 and that embodies the logic and algorithms described further below. The memory 214 may be separate from controller 212 or as embedded memory on the controller chip. The computer program may also be implemented in microcode or other type of memory accessible to the controller 212. The controller 212 is connected to a host interface 216 that communicates with the host computer 218. The host interface 216 may be any conventional computer-HDD interface, such as Serial ATA (Advanced Technology Attachment) or SCSI (Small Computer System Interface).

The electronics associated with disk dive 100 also include servo electronics 240. In the operation of disk drive 100, the read/write channel 220 receives signals from the read head and passes servo information from the servo sectors to servo electronics 240 and data signals from the data sectors to controller 212. Servo electronics 240 typically includes a servo control processor that uses the servo information from the servo sectors to run a control algorithm that produces a control signal. The control signal is converted to a current that drives actuator 130 to position the read/write head 109. In the operation of disk drive 100, interface 216 receives a request from the host computer 218 for reading from or writing to the data sectors. Controller 212 receives a list of requested data sectors from interface 215 and converts them into a set of numbers that uniquely identify the disk surface, track and data sector. The numbers are passed to servo electronics 240 to enable positioning read/write head 109 to the appropriate data sector.

The controller 212 acts as a data controller to transfer blocks of write data from the host computer 218 through the read/write channel 220 for writing to the disk 10 by the write head, and to transfer blocks of read data from the disk 10 back to the host computer 218. Disk drives typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. Disk drives may also include nonvolatile memory. One type of nonvolatile memory is "flash" memory, which stores information in an array of floating gate transistors, called "cells" which can be electrically erased and reprogrammed in blocks. Thus in disk drive 100, the controller 212 also communicates with volatile memory 250 (shown as DRAM) and optional nonvolatile memory 252 (shown as FLASH) via data bus 254.

Figure 2:
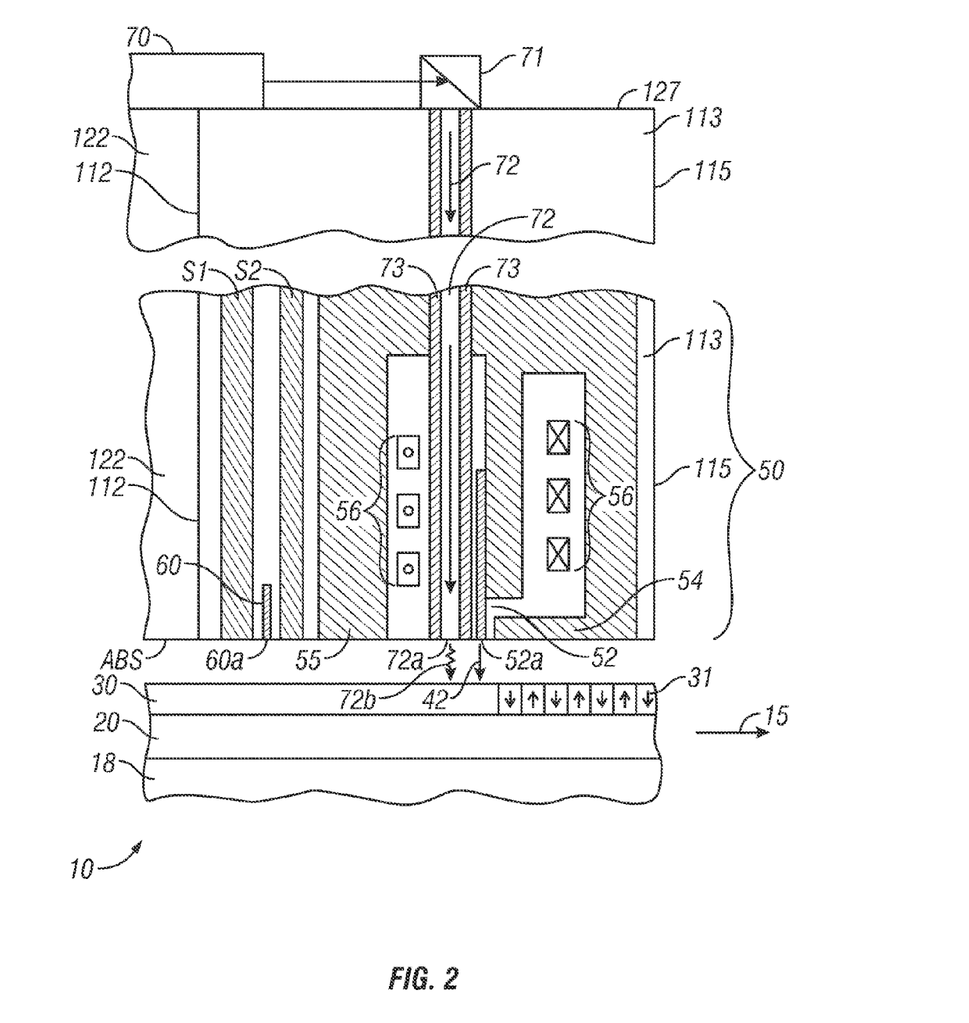
FIG. 2 is a sectional view through a portion of the TAR head and associated perpendicular magnetic recording disk of the disk drive shown in FIG. 1.

FIG. 2 is a sectional view through a portion of the TAR disk 10 and air-bearing slider 122 that functions as the head carrier with integrated TAR head formed on slider end 112. FIG. 2 is not drawn to scale because of the difficulty in showing the very small features. The TAR disk 10 is depicted as a perpendicular magnetic recording disk with a disk substrate 18, a continuous magnetic recording layer 30 with perpendicular magnetic anisotropy and an underlayer 20 that may function as a heat sink layer. The underlayer 20 may alternatively be a soft magnetic underlayer (SUL) that acts to carry the flux from the magnetic write field and would typically be located below an exchange break layer (EBL) (not shown) that breaks the magnetic exchange between the SUL and recording layer 30. The SUL may be a single layer formed of magnetically permeable materials, such as alloys of CoNiFe, FeCoB, CoCuFe, NiFe, FeAlSi, FeTaN, FeN, FeTaC, CoTaZr, CoFeTaZr, CoFeB, and CoZrNb, or a laminated structure formed of multiple soft magnetic films separated by nonmagnetic films, such as electrically conductive films like Al and CoCr or antiferromagnetic coupling films like Ru and Ir. The recording layer 30 is depicted with magnetized regions 31 that have been perpendicularly magnetized, meaning that they are stored in the recording layer 30 in a generally perpendicular or out-of-plane orientation, as shown by the arrows in regions 31. The recording layer 30 may be any high anisotropy (high $K_u$) perpendicular media, such as a cobalt-chromium-platinum (CoCrPt) alloy with a granular layer grown on a special growth-enhancing sublayer, or a multi-layer of alternating films of Co with films of platinum (Pt) or palladium (Pd). The recording layer 30 may also be $Co_3Pt$ or CoSm, or an $L1_0$ ordered alloy such as FePt or FeNiPt. The disk 10 would also typically include a protective overcoat (not shown) over the recording layer 30.

Also shown on slider 122 with disk-facing surface or air-bearing surface (ABS) is the read/write head 109 (FIG. 1) with read head 60 and write head 50. Write head 50 includes a yoke that connects write pole 52 to a first return pole 54 and a second pole 55. The ABS of slider 122 is the surface that faces the disk 10 and is shown without the thin protective overcoat typically present in an actual slider. The ABS shall mean the surface of the head carrier that is covered with a thin protective overcoat, the actual outer surface of the head carrier if there is no overcoat, or the outer surface of the overcoat. Write current passes through a coil 56 of the write head 50 to generate a magnetic field (arrow 42) at the tip 52a of write pole 52. This magnetic field magnetizes the recording layer 30 beneath the write pole tip 52a as the disk 10 moves past the write head 50 in the direction of arrow 15. The detection or reading of the recorded regions 31 is by a read head 60 having a sensing edge 60a at the ABS that detects the transitions between the magnetic regions 31. The read head 60 is typically a magnetoresistive (MR) read head, such as a tunneling MR (TMR) read head in which a sense current passes perpendicularly through the layers making up the head. A pair of magnetically permeable shields S1 and S2 are located on opposite sides of read head 60 to prevent magnetic flux from magnetized regions 31 other than the region being read from reaching the read head sensing edge 60a. The write coil 56 is shown as a conventional helical coil wrapped around the portion of the yoke that directly supports the write pole 52, with the electrical current directions being shown as into the paper by the coil cross-sections marked with an "X" and out of the paper by the coil cross-sections marked with a solid circle. However, the coil may also be a conventional flat or "pancake" coil wrapped around the yoke. The slider 122 with integrated TAR head has an outer surface or trailing end 115 with electrically conductive pads (not shown) that connect through the insulating layers 113 to the read head 60 and coil 56 of write head 50.

The slider 122 also supports a laser 70, mirror 71, and an optical channel or waveguide 72 which has its output end 72a at the ABS. The laser 70 and mirror 71 are shown as being supported on the top surface 127 of slider 122. The optical waveguide 72 is depicted in FIG. 2 as extending through the yoke of write head 50 and being located between the write pole 52 and return pole 55. However the optical waveguide 72 may be located at other locations, such as between shield S2 and return pole 55. The waveguide 72 is formed of a core material such as $Ta_2O_5$ or another high index dielectric material that is transmissive to radiation at the wavelength of the laser and is surrounded by a dielectric cladding layer 73 (for example $SiO_2$ or $Al_2O_3$) of lower refractive index than the core material. While the slider 122 in FIG. 2 is depicted as supporting mirror 71 for directing the laser radiation from laser 70 into waveguide 72, it is known to use a grating coupler coupled to the waveguide, as described for example in US 20090310459 A1. Also, the laser 70 may be attached to slider 122 in a manner to be oriented orthogonal to top surface 127 so as to direct laser light directly into waveguide 72 without the need for mirror 71. The non-shaded portions of the TAR head formed on slider end 112 in FIG. 2, with the exception of optical waveguide 72, represent insulating material, typically alumina. The laser 70 may be a CD-RW type laser diode with a wavelength of approximately 780 nm. The laser 70 may also be a vertical-cavity surface-emitting laser (VCSEL), or an external-cavity VCSEL that generates laser radiation with a wavelength between about 920 nm and 1000 nm.

The optical waveguide 72 directs radiation (represented by wavy arrow 72b) from its output end 72a to the recording layer 30 to heat the recording layer to lower the coercivity sufficient to ensure good writeabilty. In some implementations of TAR the recording layer may be heated to nearly or above the Curie temperature of the material making up the recording layer 30. During writing, the recording layer 30 moves relative to the slider 122 in the direction shown by arrow 15 so that the heated area of the recording layer can be exposed to the write field 42 from the write pole tip 52a. The heating from radiation through optical waveguide 72 temporarily lowers the coercivity of the recording layer 30 so that the magnetic regions may be oriented by the write field 42 from write pole tip 52a. The magnetic regions become oriented by the write field 42 if the write field $H_w$ is greater than the switching field $H_0$. After a region of the recording layer 30 has been exposed to the write field from the write pole tip 52a and heat from the optical waveguide 72 it becomes written or recorded as a magnetized region 31 when it cools. The transitions between recorded regions 31 represent written data "bits" that can be read by the read head 60 with its sensing edge 60a at the ABS.

In the preferred embodiment the recording layer 30 is a granular layer formed of a high-$K_u$ alloy comprising at least Co, Pt and Cr. Depending on the specific composition, a high-$K_u$ granular CoPtCr alloy may have a switching field $H_0$ at ambient temperature of greater than about 8 kOe and up to about 20 kOe. The heat source must reduce the coercivity $H_c$ enough so that $H_0$ is reduced to a value significantly below the write field. Depending on the specific composition of the CoPtCr alloy and the specific write head, the heat source should reduce the coercivity $H_c$ by at least 500 Oe, meaning that $H_0$ would be reduced by about at least 800 Oe. For example, a CoPtCr alloy may have a $K_u$ of approximately $7 \times 10^6$ ergs/cm$^3$ and a coercivity $H_c$ at ambient temperature of about 9 kOe, meaning that the switching field $H_0$ may be above 12 kOe. The heat source would raise the temperature of the recording layer 30 to approximately 250° C. so that when exposed to the write field from the write pole tip 52a, the coercivity $H_c$ would be reduced by approximately 4 kOe (a switching field $H_0$ reduction of about at least 5 kOe). This temperature is substantially below the Curie temperature of the CoPtCr alloy, which would be approximately 600° C.

Figure 3:
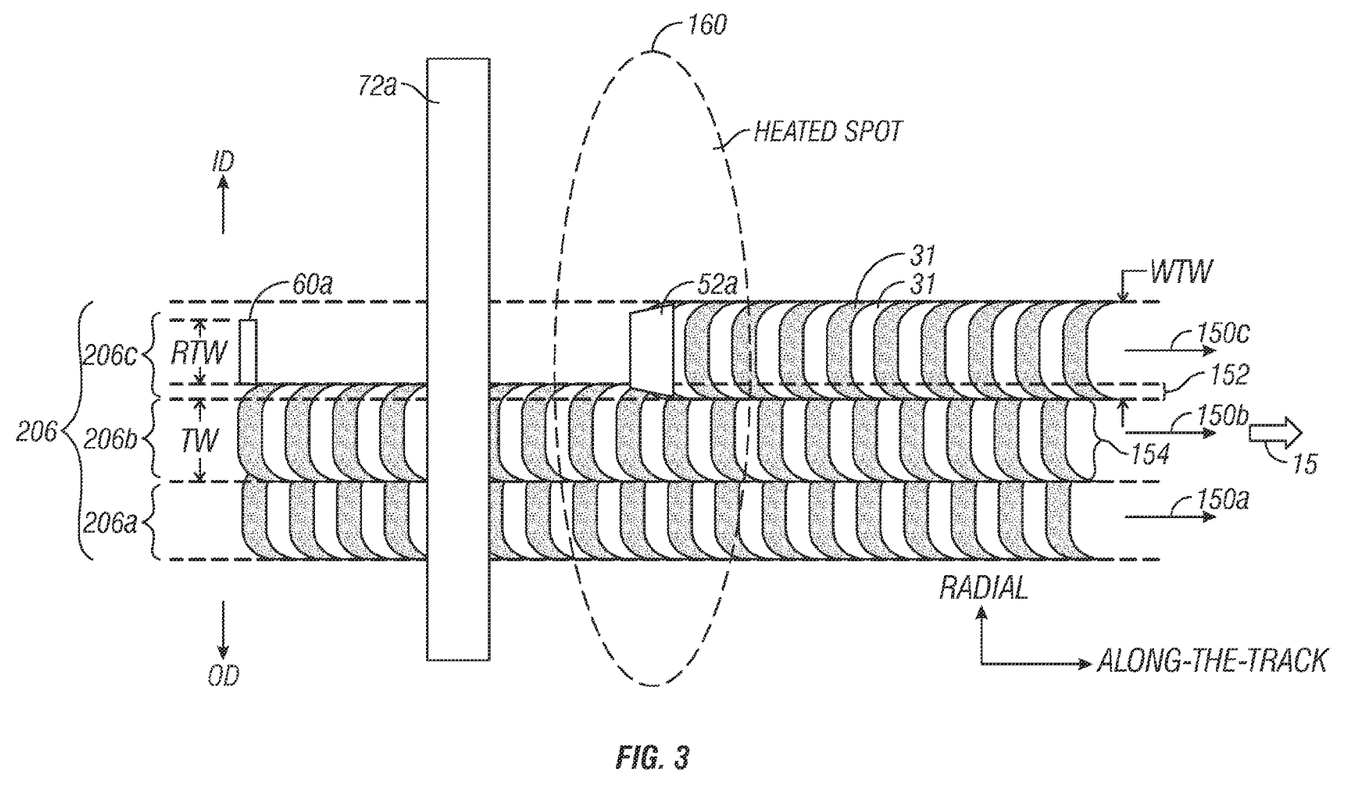
FIG. 3 is a view from below the recording layer of the disk toward the air-bearing surface (ABS) of the TAR head carrier and illustrates the method of shingled writing with thermal assistance from a rectangular waveguide wide-area heater.

FIG. 3 is a view from below the recording layer of the disk toward the ABS and is intended to be a graphical representation of the method of recording magnetized regions on the disk using shingled writing with thermal assistance. Two concentric tracks 206a and 206b of typical annular band (like annular band 206 in FIG. 1) are shown, along with a path of magnetic transitions aligned with the write pole tip 52a that will result in a third data track 206c. The write pole tip 52a has a cross-track width (WTW) that is wider than the read head sensing edge 60a cross-track width (RTW). When writing data, the write pole tip 52a generates paths of magnetic transitions (shown as the transitions between white and shaded magnetized regions 31) as the recording layer moves in the direction of arrow 15. In shingled writing all of the data tracks in an annular band are written whenever any portion of the data in an annular band is to be re-written. To write the magnetic transitions that result in the three data tracks the write head first writes a path centered along line 150a, after which the actuator moves the write head radially by an incremental distance to write a path of magnetic transitions centered along line 150b, after which the actuator moves the write head radially by an incremental distance to write a path of magnetic transitions along line 150c. Path 150b overlaps a portion of path 150a and path 150c overlaps a portion of path 150b. For example, path 150b has an overlapped portion 152 and a non-overlapped portion 154. After all the tracks in an annular band have been written in the shingled writing method, the data tracks are the non-overlapped portions, as shown by data tracks 206a, 206b. The written data tracks thus have a radial track width (TW) that is typically slightly less than WTW and slightly greater than RTW of the read head sensing edge 60a. For example, RTW is typically 0.6 to 0.7 times TW. In the example of FIG. 3, the bottom of the figure is meant to be a radially outer portion of the band 206, so the data tracks are written in the direction from disk outside diameter (OD) to inside diameter (ID). However, a disk drive can be formatted such that writing of the data tracks in one or more bands can be from ID to OD, with different bands being written in different directions.

As shown in FIGS. 2 and 3, the waveguide 72 (with output end 72a at the ABS) is not coincident with the write pole tip 52a, but is located up-track from the write pole tip 52a, preferably by a distance equal to or greater than 50 nm. Thus the waveguide output end 72a generates a laser spot that heats an area or spot 160 on the recording layer which then moves down-track where it can be exposed to the magnetic write field from the write pole tip 52a. As shown in FIG. 3, the waveguide output end 72a is a "wide-area" heater because it heats an area wider than TW and WTW, preferably an area that covers multiple tracks on both sides of the track aligned with the write pole tip 52a. The heated spot 160 may cover a relatively large number of tracks, for example if the TW is about 50 nm, the heated spot 160 may be about 3 microns, and thus cover about 60 tracks (about 30 tracks on each side of the write head). However, it is only when a portion of the recording layer in the heated spot 160 is exposed to the write field from the trailing edge of the write pole tip 52a that a magnetic transition is written. Thus the locations of the down-track transitions 31 in the circular path 150c are determined by the write field gradient of the write pole tip 52a and not the thermal gradient between the heated spot 160 and an unheated region of the recording layer. During shingled writing only the tracks adjacent the track being written are exposed to the fringing magnetic field from the write head for a single head pass. The media can be designed to be sufficiently stable during this single head pass to avoid ATE while allowing for an increase in areal density compared to traditional shingled recording without the use of heat.

However, with such a wide-area heater, each time an entire annular band is written, the data in each data track in the band will be exposed to the heat for successive passes after it has been written, for example at least 30 passes, i.e., about half the cross-track width of the heated spot in this example. As a result of the large heated spot there are a significant number of tracks that experience only temperature increases but no significant magnetic fields. This includes data tracks in the bands adjacent to a band being written because the heated spot 160 extends across multiple tracks and thus into adjacent bands. For a small inter-band gap, for example a gap only 2 TW wide, this can result in a large number of tracks in adjacent bands being heated. Because the bands are written independently, the number of passes of the heat spot and thereby the number of times the data tracks in a band are exposed to elevated temperatures without being re-written is related to the number of re-writes of the adjacent bands. This is an un-controlled and therefore unlimited number of passes and exposure time of these tracks to an elevated temperature, which can result in an unacceptable level of thermal decay.

Figure 4:
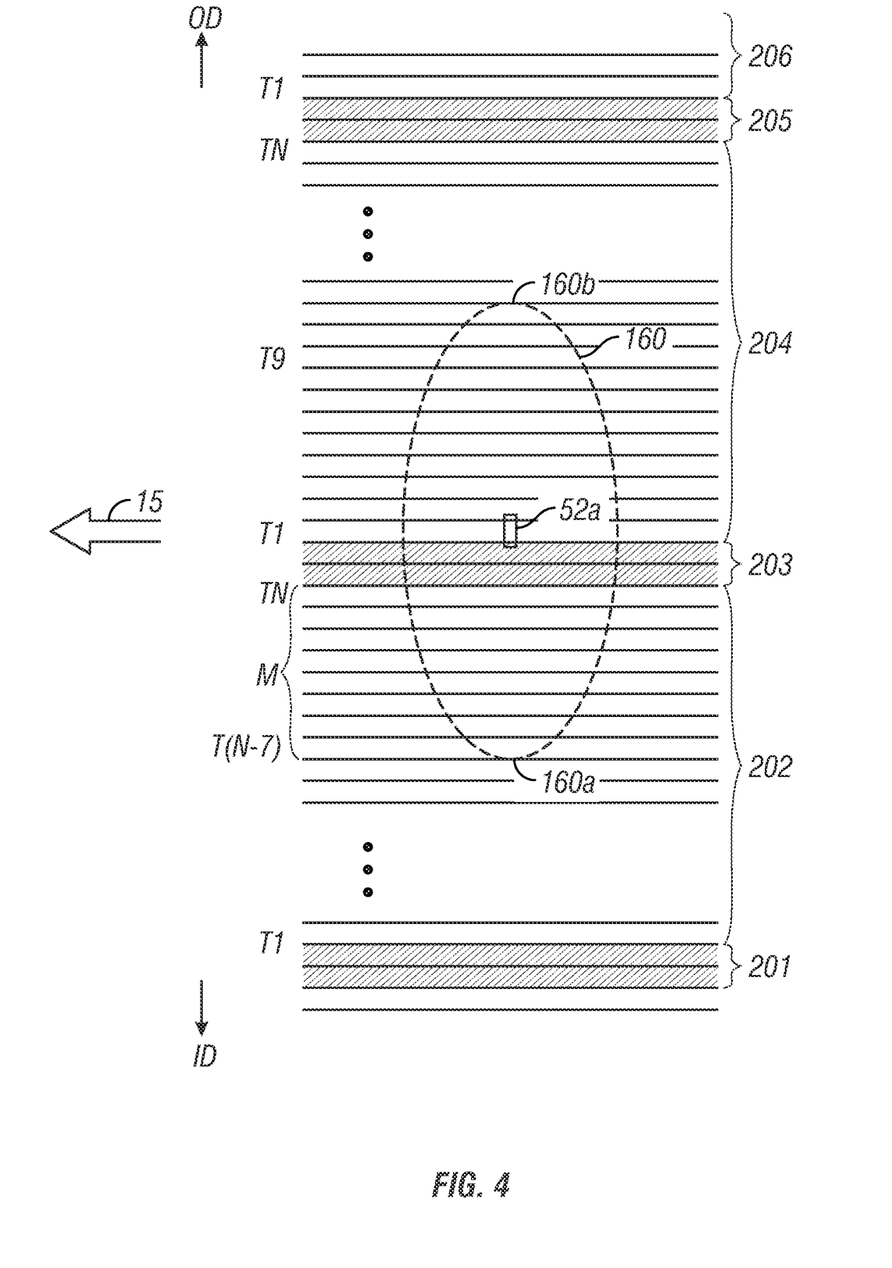
FIG. 4 is a schematic showing portions of two annular bands and the heat spot from the wide-area heater overlapping both bands for illustrating the method of avoiding adjacent track erasure (ATE) from a wide-area heater according to the invention.

In this invention the number of writes to each band is counted and when that count reaches a predetermined threshold value, one or more tracks in an adjacent band are re-written. The invention will be described with FIG. 4, which is a schematic showing portions of two annular bands and the heat spot from the wide-area heater overlapping both bands. In FIG. 4, there are two adjacent bands 202, 204 separated by an inter-band gap 203. The write pole tip 52a, and thus also wide-area heater, are depicted as being centered on the radially inner or first track T1 of band 204. The heat spot 160 generated by the wide area heater is depicted as having a cross-track width of approximately 21 tracks with radial edges 160a, 160b. Thus when the heat spot 160 is centered on the radially inner track T1 of band 204, it extends across the gap 203 and into a number of radially outer tracks in adjacent band 202. The number of tracks the heat spot 160 extends into an adjacent band, referred to as a number M, depends on the particular design of the disk drive, but in this example M=8. In shingled recording band 204 will be written by the write pole tip 52a writing all the tracks sequentially, for example from track T1 to track TN. Thus as the disk rotates in the direction 15, the actuator moves the write pole tip 52a radially (outwardly toward the OD in this example). During this writing the heat spot 160 will also move radially outwardly. After M rotations of the disk the write pole tip 52a will have moved radially M tracks and be on track T9 in band 204, and the radial edge 160a of heat spot 160 will have moved radially M tracks and be in the gap 203. Thus during the writing of band 204, the radially outer track TN of adjacent band 202 will have been exposed to the heat spot 160 for a length of time equal to M rotations of the disk. Track T(N-M-1) (track T(N-7) for M=8 in this example) in band 202 will have been exposed to the heat spot 160 for a length of time equal to only 1 rotation of the disk. Also, as the last radially outer tracks of band 204 are written, the heat spot 160 will also expose the first M tracks of radially outer adjacent band 206. Thus during the writing of all the tracks in band 204, the radially inner track T1 of band 206, like radially outer track TN of band 202, will also have been exposed to the heat spot 160 for a length of time equal to M rotations of the disk. Similarly, track TM (not shown in FIG. 4) in band 206, like track T(N-M-1) in band 202, will have been exposed to the heat spot 160 for a length of time equal to only 1 rotation of the disk.

The exposure of the recording layer media to an elevated temperature for a sufficient length of time can lead to undesirable loss of magnetization as a result of thermal decay. The thermal decay rate depends on the media composition, grain size and temperature and can be calculated from the well-known Neel-Arrhenius equation. For example, using the above example of a typical granular CoPtCr alloy with a $K_u$ of approximately $7 \times 10^6$ ergs/cm$^3$ and a wide-area heater that heats this media to about 250° C., approximately 3% of the magnetization would be lost after a total decay time S of $10^{-4}$ sec and 6% after $10^{-3}$ sec. The amount of acceptable magnetization decay is chosen, for example 5%, 10%, etc., and the decay time S corresponding to this magnetization decay is calculated and used to determine when written data needs to be re-written. In this invention this calculated decay time S is used to determine the number of times (a predetermined count threshold TH) that a band can be written or re-written before adjacent bands, or selected tracks within adjacent bands, need to be re-written because the loss of magnetization is too large.

Given the known rotational speed of the disk drive, the media in a track will be exposed to the heat spot for a known period of time, P seconds, for each rotation of the disk. If the heat spot overlaps into M tracks on an adjacent band, then as explained above, for a single writing of a band, the nearest track in an adjacent band will have a total heat exposure time of M*P. The threshold TH number of writes to a band is then determined as TH=S/(M*P). Thus, in this invention the number times each band is written is counted and when this count C equals TH, the adjacent bands, or selected tracks within adjacent bands, are re-written. The assigned value of TH may be different for different bands. The predetermined TH values may be stored in memory 214, 250 or 254 accessible by HDC 212 (FIG. 1).

As one example, assume the acceptable amount of magnetization decay has been chosen to be 6% and thus the decay time S is $10^{-3}$ sec, and the media is heated to about 250° C. For an along-the-track heat spot length of 0.25 µm, a track pitch such that M=30, and an along-the-track disk velocity of 10 m/s, then for each writing to a band, the nearest track in an adjacent band will have a total exposure time (M*P) of $7.5 \times 10^{-7}$ sec. Thus TH is calculated to be S/(M*P) or about 1300, meaning that after about 1300 writes to a band the magnetization decay in the nearest track in an adjacent band will have reached about 6%. Thus, when the count C reaches TH=1300, then at least this track, or more tracks in the group of M=30 tracks, or all the tracks in this adjacent band, will be re-written to avoid ATE.

Referring again to FIG. 4, if band 202 is formatted in a manner such that it is written in the direction from ID to OD, then because in shingled writing each pass of the write head overlaps the previous pass (as better illustrated in FIG. 3), it is possible to re-write just those tracks overlapped by heat spot 160 near the radially outer portion of band 202. So, when C=TH for band 204, it is possible to re-write only track TN of and 202 (or additional tracks in the group of overlapped M tracks) in band 202. However, if band 202 is formatted in a manner such that it is written in the direction from OD to ID, then it is not possible to re-write just those tracks overlapped by heat spot 160. Thus in this invention, when C=TH for band 204, all of the tracks in band 202 would be re-written in the direction from ID to OD. If only a partial re-write of a band is performed, i.e., only one or more of the M tracks near an inner or outer portion of a band, then at some point it will be necessary to re-write the entire band after having done one or more partial re-writes.

The operation of the disk drive as described above may be implemented as a set of computer program instructions stored in memory and executable by a processor, such as the HDC 212 (FIG. 1), or a separate controller or microprocessor in the disk drive. The controller performs logical and arithmetic operations based on the program instructions stored in memory, and is thus capable of performing the functions described above, including counting the number of writes to each band and directing re-writes when the count reaches a threshold.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally-assisted magnetic recording disk drive comprising:
    a rotatable magnetic recording disk comprising a substrate and a magnetic recording layer on the substrate;
    a head carrier having a recording-layer-facing surface;
    a heat source on the head carrier for heating an area of the recording layer as the disk rotates;
    a write head on the head carrier, the write head generating a generally circular path of magnetic transitions in the heated recording layer as the disk rotates, the write head having a radial width less than the radial width of the heated area of the recording layer; and
    an actuator connected to the head carrier for moving the head carrier generally radially across the disk, the actuator being capable of moving the head in an increment less than the radial width of a path, whereby the write head generates partially overlapping generally circular paths of magnetic transitions, the non-overlapping portions of the circular paths representing data tracks, the data tracks being grouped on the recording layer in annular bands separated by annular gaps;
    a controller for selecting the data tracks where data is to be written by the write head;
    memory coupled to the controller; and
    wherein the controller includes logic for executing method acts comprising:
        (a) counting the number of writes to a band; and
        (b) when the count reaches a threshold, re-writing data in at least one track in a band radially adjacent to said band having said threshold count.

2. The disk drive of claim 1 wherein re-writing data in at least one track comprises re-writing data in all tracks in said radially adjacent band.

3. The disk drive of claim 1 wherein re-writing data in at least one track comprises re-writing data in all tracks in both the radially inner band and the radially outer band adjacent to said band having said threshold count.

4. The disk drive of claim 1 wherein when the heat source is centered on the radially inner track of a band, the heated area of the recording layer includes M tracks in the radially inner adjacent band; and wherein re-writing data in at least one track comprises re-writing data in at least all M tracks in said radially inner adjacent band.

5. The disk drive of claim 1 further comprising a magnetoresistive read head on the head carrier for reading magnetic transitions in non-overlapping portions of the circular paths.

6. The disk drive of claim 1 further comprising a laser, and wherein the heat source comprises an optical waveguide coupled to the laser and having an output face at the recording-layer-facing surface for directing laser radiation to the recording layer.

7. The disk drive of claim 1 wherein the heat source heats the recording layer to a temperature less than the Curie temperature of the recording layer.

8. A thermally-assisted shingled-writing magnetic recording disk drive comprising:
   a rotatable magnetic recording disk comprising a substrate and a perpendicular magnetic recording layer on the substrate;
   a slider having an air-bearing surface (ABS) facing the recording layer;
   a laser;
   an optical waveguide on the slider and coupled to the laser, the waveguide having a laser radiation output end at the ABS for heating an area of the recording layer as the disk rotates;
   a write head on the slider and having a write pole tip at the ABS for writing data in concentric data tracks of the heated recording layer as the disk rotates, the write head having a radial width less than the radial width of the heated area of the recording layer and the concentric data tracks being grouped on the recording layer in annular bands separated by annular gaps;
   a read head having a sensing edge at the ABS for reading data in the concentric data tracks;
   a controller for selecting the data tracks where data is to be written by the write head;
   memory coupled to the controller; and
   wherein the controller includes logic for executing method acts comprising:
   (a) counting the number of writes to each band; and
   (b) when the count in a band reaches a predetermined threshold for that band, re-writing data in at least the nearest track in a band radially adjacent to said band having said threshold count.

9. The disk drive of claim 8 wherein re-writing data in at least the nearest track in a band radially adjacent to said band comprises re-writing data in the nearest track in both the radially inner adjacent band and the radially outer adjacent band.

10. The disk drive of claim 8 wherein re-writing data in at least the nearest track comprises re-writing data in all tracks in a band radially adjacent to said band having said threshold count.

11. The disk drive of claim 1 wherein when the waveguide is centered on the radially inner track of a band, the heated area of the recording layer includes M tracks in the radially inner adjacent band; and wherein re-writing data in at least the nearest track comprises re-writing data in at least all M tracks in said radially inner adjacent band.

12. The disk drive of claim 1 wherein the laser and optical waveguide heat the recording layer to a temperature less than the Curie temperature of the recording layer.

* * * * *